(12) United States Patent
Ampuero Auza et al.

(10) Patent No.: US 7,247,587 B2
(45) Date of Patent: Jul. 24, 2007

(54) NONWOVEN MATERIAL FOR LOW FRICTION BEARING SURFACES

(75) Inventors: Jaime A. Ampuero Auza, Zurich (CH); Mikhail R. Levit, Richmond, VA (US); Arthur R. Nelson, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 103 days.

(21) Appl. No.: 11/266,712

(22) Filed: Nov. 3, 2005

(65) Prior Publication Data

US 2006/0057925 A1    Mar. 16, 2006

Related U.S. Application Data

(62) Division of application No. 09/911,528, filed on Jul. 24, 2001, now Pat. No. 7,015,159.

(51) Int. Cl.
  *D04H 1/00* (2006.01)
  *D04H 13/00* (2006.01)
  *D04H 3/00* (2006.01)
  *D04H 5/00* (2006.01)
  *D21C 3/00* (2006.01)
  *D21C 11/00* (2006.01)

(52) U.S. Cl. .................. 442/415; 442/117; 442/148; 442/164; 428/361; 428/364; 428/365; 428/372; 162/13

(58) Field of Classification Search ............. 442/415, 442/117, 148, 164; 428/361, 364, 365, 372; 162/13
See application file for complete search history.

(56) References Cited

U.S. PATENT DOCUMENTS

| | | |
|---|---|---|
| 2,804,886 A | 9/1957 | White |
| 3,037,893 A | 8/1962 | White |
| 3,055,788 A | 9/1962 | Stanhope et al. |
| 3,114,672 A | 12/1963 | Schott |
| 3,242,120 A | 3/1966 | Steuber |
| 3,620,903 A | 11/1971 | Bunting et al. |
| 3,655,853 A | 4/1972 | Gallup |
| 3,756,908 A | 9/1973 | Gross |
| 4,324,574 A | 4/1982 | Fagan |
| 4,361,619 A | 11/1982 | Forsten et al. |
| 4,612,237 A | 9/1986 | Frankenburg |
| 4,698,267 A | 10/1987 | Tokarsky |
| 4,886,578 A | 12/1989 | Hendren et al. |
| 5,194,484 A | 3/1993 | Logothetis |
| 5,409,573 A | 4/1995 | Weeks |
| 5,688,370 A | 11/1997 | Hagen et al. |
| 5,723,081 A | 3/1998 | Blankenbeckler et al. |
| 5,762,846 A | 6/1998 | Blankenbeckler et al. |
| 5,954,962 A | 9/1999 | Adiletta |
| 6,011,118 A | 1/2000 | Asagi et al. |

FOREIGN PATENT DOCUMENTS

| | | |
|---|---|---|
| EP | 1 030 543 A1 | 8/2000 |
| GB | 861506 | 2/1961 |
| WO | WO 96/29146 | 9/1996 |
| WO | WO 01 07713 | 2/2001 |

OTHER PUBLICATIONS

Patent Abstracts of Japan, vol. 1999, No. 07, Mar. 31, 1999 & JP 02 015509 A (E. I. Du Pont De Nemours & AMP; Co), Jan. 19, 1990 Abstract.

*Primary Examiner*—Norca Torres

(57) ABSTRACT

The present invention relates to a saturable nonwoven material comprising fluoropolymer floc and aramid floc, which can be used as a substrate for a liner for self-lubricating bearings and for other applications.

4 Claims, No Drawings

NONWOVEN MATERIAL FOR LOW FRICTION BEARING SURFACES

RELATED APPLICATION

The present patent application is a divisional of Ser. No. 09/911,528 filed Jul. 24, 2001 now U.S. Pat. No. 7,015,159.

BACKGROUND OF THE INVENTION

1. Field of the Invention

This invention relates to saturable nonwoven materials comprising fluoropolymer fibers and other additional wettable structural organic fibers. Such nonwovens may be used as a liner material for self-lubricating bearing surfaces, as a sealant, in filtration systems, as electrical insulation and in other applications.

2. Description of the Related Art

The use of a woven or knitted fabric as a liner material for self-lubricating bearings is well known in the art. These woven or knitted fabrics typically consist of fluoropolymer yarn and structural yarns (for example, cotton, polyester or glass fiber etc.).

U.S. Pat. Nos. 2,804,886 (White), U.S. Pat. No. 3,055,788 (Stanhope et al.), U.S. Pat. No. 3,037,893 (White) and GB 861,506 (Wright et al.) disclose the use of woven fluoropolymer fabric in friction applications. However, liners based on such fabrics are very expensive and typically limited to a thickness of about 0.127 mm or greater. Such woven fabrics known in the industry require complex and expensive manufacturing processes and are characterized by a significant resistance to heat flow. This heat resistance results in the bearings becoming overheated at or above relative speeds in the range of about 0.5 m/s causing increased levels of friction, thus reducing their service life, as indicated by a significant loss of liner material, thereby limiting their operating conditions and requiring more numerous replacements of such liners which results in increased production or operating costs.

Also, a nonwoven structure comprising fluoropolymer fibers and an amount of a binder sufficient to provide an appropriate level of wet and dry strength to the nonwoven structure is well known in the art. U.S. Pat. No. 3,114,672 (Schott) discloses such a material, wherein it can be used for the filtration of hot gases that are chemically active.

Also known in the art, is a pressboard material, which consists of m-aramid fiber, m-aramid fibrids, and fluoropolymer fiber. The pressboard material is primarily utilized as electrical insulation as is described in U.S. Pat. No. 4,888,578 (Hendren, Provost et al.).

The present invention offers the advantage of providing a saturable or open porous, nonwoven structure, which can be impregnated with a resin such that the resin permeates throughout the entire structure, comprising fluoropolymer fibers blended with other additional wettable structural organic fibers. Additionally, saturable nonwoven structures having the thickness of the present invention and the applications of the present invention have not been described in the art. Further, the present invention addresses the problems recognized within the industry that are encountered through the use of thick woven fabrics by providing a thin structure. Further, the present invention offers several other advantages in that it can be used at higher speeds than conventional materials, or it can be used at similar speeds as conventional materials yet have an increased service life, and it may be utilized at higher loading capacities.

SUMMARY OF THE INVENTION

The present invention relates to a saturable nonwoven material comprising a blend of fluoropolymer fibers and other additional wettable structural organic fibers along with any incumbent fibers used in paper or other sheet structures including, but not limited to polyester, rayon, cellulose, aramid, polyamide, wool, cotton, polyolefin (with structural fibers) and combinations thereof, which can be used as a liner material for self-lubricating bearings and other applications. The additional wettable structural organic fibers impart new characteristics to the saturable nonwoven material of the present invention, such as friction resistance.

The invention also relates to a paper or a sheet or a prepreg comprising the saturable nonwoven structure of the present invention and a resin, as well as to a self-lubricating bearing.

Further, the present invention relates to a process for making a saturable nonwoven material of the present invention comprising the steps of:

a.) delivering an aqueous dispersion of a mixture comprising wettable structural organic floc, fluoropolymer floc, and optionally a binder onto a screen of a papermaking device;

b.) withdrawing water from the aqueous dispersion to leave a wet paper felt;

c.) drying the wet paper felt; and d.) optionally, calendering the dried nonwoven material for further densification of the material.

DETAILED DESCRIPTION

The present invention provides a saturable nonwoven material that is useful, for example, as a liner of self-lubricating bearings or other low friction load bearing surfaces. Further, the present invention may be used in filtration systems due to its chemical resistance, and as electrical insulation due to its low dielectric constant and low dissipation factor and in other applications, for example, in flange material utilized in industrial piping where chemical resistance is a necessary property.

A saturable nonwoven material of the present invention comprises a mixture of fluoropolymer floc and one or more other additional wettable structural organic floc, and may optionally contain a binder. Preferably, the fluoropolymer floc comprises at least about 30% by weight of the mixture. Additionally, the binder, when utilized comprises up to about 30% by weight of the mixture. Those practitioners skilled in the art would recognize and understand when such a binder would be necessary. Also, the present invention preferably has a substantially uniform distribution of the fluoropolymer floc, the at least one additional wettable structural organic floc, and the optional binder when the binder utilized. However, such a distribution is not a requirement.

The term "structure", when used in conjunction with "fiber" or "floc", refers to fiber or floc that performs a reinforcement function providing structural integrity and strength. It also refers to a non-flowing support fiber or floc allowing fluoropolymer film from the fluoropolymer fiber to flow during the use of the bearing. The structural fiber or floc allows for greater wear resistance of the present invention. Additionally, the fiber or floc provides frictional melt resistance to the present invention.

The term "wettable" refers to a structural organic floc that is wettable by a thermoset resin composition including, but not limited to, epoxy, phenolics and polyamides.

The term "self-lubricating", as used herein, refers to a bearing wherein no additional lubricant, such as grease, oil or other lubricant, is required due to the bearing by itself having a polymer surface with a low coefficient of friction which results in a low wear.

The saturable nonwoven material of the present invention may be made in a conventional wet-laid papermaking process, which includes dispersing fibers in water, pouring the dispersion on a screen, dewatering the dispersion under the action of gravity and a vacuum with formation of the sheet, and drying. Wet pressing (compression) of the sheet against one felt or between two felts can be performed prior to drying to increase the sheet's density and strength and reduce its water content before drying. This process also includes the optional use of a binder, wherein such binders include, but are not limited to, aramid fibrids. Other binders known within the industry may also be used in the process, for example, water-soluble poly (vinyl alcohol) fibers, poly (vinyl acetate) dispersions, fluoropolymer dispersions, and different types of pulps including cellulose. Other methods of making a saturable nonwoven material of the present invention include, but are not limited to, dry-laid methods of manufacturing which are well known within the art, such as the spunlace process, in which fibers are deposited on a screen from air dispersion followed by hydroentangling.

The formed saturable nonwoven material of the present invention may optionally be calendered, depending on the density and strength requirements of the final material.

A prepreg based on the saturable nonwoven material of the present invention can be made by any known technique with the usage of a matrix resin solution or dispersion or melt having an ability to reasonably flow into the structure of the present invention. The matrix resin can be one of either high or low viscosity. However, if the matrix resin has a high viscosity it should be dissolved in solution. Whereas, if a low viscosity matrix resin is utilized, the solution or dispersion may not be necessary.

As used herein, "prepreg" refers to a nonwoven fibrous material impregnated by a resin, but still has enough formability to be compressed and/or shaped during preparation of the final composite. In the case of thermosets, they are usually in a curing stage B (partially soluble) in the prepreg and can be cured additionally to stage C (cross-linked, not soluble) later.

The saturable nonwoven materials of the present invention have a basis weight of about 17 $g/m^2$ to about 810 $g/m^2$ and a thickness of about 0.02 mm to about 8.0 mm.

Several methods may be utilized for the preparation of a self-lubricating bearing of the present invention. Method 1 generally comprises the steps of applying one or several layers of the prepreg to a metal surface then followed by the application of pressure and temperature (if necessary). Method 2 generally comprises the steps of applying one or several layers of the prepreg to a mandrel with a release agent applied to the mandrel of any shape, but preferably round, and then overwinding this structure with fiberglass and resin to form a composite bearing. Method 3 generally comprises the steps of applying one or several layers of the prepreg to a mandrel with a release agent applied to the mandrel of any shape, but preferably round, and then overmolding with a thermoplastic or an elastomer to form bearings.

Further, it is surprising and unexpected that a saturable nonwoven structure comprising fluoropolymer fibers and the other additional wettable structural organic fibers can provide the same level of expected performance or improved performance and the same expected work life or improved work life of self-lubricating bearings as a woven or knitted fabric.

The term "floc", as used herein, means fibers that are cut to a short length and which are customarily used in the preparation of wet-laid sheets.

The fluoropolymer floc has an length of from about 3 to about 30 millimeters. A preferred length is from about 5 to about 13 millimeters. Fluoropolymer floc is made by cutting continuous fluoropolymer fibers of poly(tetrafluoroethylene) (PTFE) produced using paste extrusion or matrix spinning. Examples of fluoropolymer fibers include, but are not limited to, poly(tetrafluoroethylene-co-hexafluoropropylene (FEP), poly(tetrafluoroethylene-co-perfluoro(alkoxy vinyl ether)) (PFA), modified poly(ethylene-co-tetrafluoroethylene) (ETFE), poly(vinylidene fluoride) (PVDF), poly(chlorotrifluoroethylene) (PCTFE) and other fibers made of perfluorinated polymers. However, matrix spun PTFE fibers are preferred, such as those prepared by dispersion spinning, dry spinning, wet spinning, and melt spinning. Additionally different types of strong and thermostable floc can be used as wettable structural organic floc including, but not limited to polyester, rayon, aramid, cellulose, polyamide, polyolefin, wool, cotton and combinations thereof. The wettable structural organic floc has a length of from about 2 to about 30 millimeters. Wettable structural organic fibers have less potential for negative health effects during both processing and final usage when compared with structural inorganic fibers. Generally, structural inorganic fibers are more hazardous if inhaled or precipitated on the skin or eyes. Additionally, incorporation of structural inorganic fibers in the nonwoven structure of the present invention greatly restricts the ability to obtain a uniform distribution of the fluoropolymer floc, additional wettable structural floc and the optional binder. Further, use of structural inorganic fibers restricts the ability to obtain a light and thin liner because such fibers do not provide the requisite level of integrity and strength to the nonwoven structure. Aramid floc is preferred due to its high thermal stability, dimensional stability and high strength. Aramid floc is made by cutting continuous aramid fibers. The present invention will be described in terms of using aramid floc. However, the other above-noted types of structural floc could be substituted therefore and still be within the scope of the invention.

The term "aramid fiber", as used herein, means aromatic polyamide fiber, wherein at least 85% of the amide (—CONH—) linkages are attached directly to two aromatic rings.

Optionally, additives can be used with the aramid and dispersed throughout the polyfiber structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

Different types of binders can be used in the manufacturing of the saturable nonwoven material by wet-laid (papermaking) techniques. Aramid fibrids are the preferred type of the binder due to their thermal stability, high binding ability and their action as an aid for better dispersion in water of hydrophobic fluoropolymer floc. The binder may also comprise a mixture of at least one aramid fiber and a wet-strength resin. However, other binders known to those practitioners skilled in the art can also be used, for example, water-soluble poly (vinyl alcohol) fibers, poly (vinyl acetate) dispersions, fluoropolymer dispersions, and different types of pulps including cellulose.

The term "fibrids", as used herein, means very small, nongranular, fibrous or film-like particles with at least one of their three dimensions being of minor magnitude relative to the largest dimension. These particles are prepared by precipitation of a solution of polymeric material using a non-solvent under high shear. The term "aramid fibrids", as used herein, means non-granular film-like particles of aromatic polyamide having a melting point or decomposition point above 320° C. The fibrids have an largest dimension length in the range of about 0.2 mm to about 1 mm with a length-to-width aspect ratio of about 5:1 to about 10:1. The thickness dimension is on the order of a fraction of a micron, for example, about 0.1 mm to about 1.0 microns. Use of such aramid fibrids in a never-dried state, while not required, is preferred. The fibrids can be deposited as a binder physically entwined about the aramid floc component of a paper.

In addition to aromatic polyamide, aramid fibrids can optionally comprise dyes, pigments, additives such as antistatic agents, surfactants, or fillers such as carbon black, silica and titanium dioxide.

The present invention is further directed to a saturable nonwoven material or a saturable sheet structure comprising a blend of fluoropolymer floc and one or more wettable structural organic floc. The composition of the nonwoven material can optionally include up to about 30% by weight of a binder, wherein a fibrous binder or fibrid binder is preferred.

The saturable nonwoven material of the present invention can be made by any conventional process for wet-lay or dry-lay forming a nonwoven sheet. An example of such a process for making the sheet of the invention is one that includes the steps of:

a) delivering an aqueous dispersion of a mixture of fluoropolymer floc, other wettable structural organic floc and optionally a binder onto a screen in a papermaking device;
b) withdrawing water from the aqueous dispersion to leave a wet nonwoven felt;
c) drying the wet nonwoven felt; and
d) optionally, calendaring the formed and dried nonwoven material of the present invention, thereby increasing its density and strength.

The saturable nonwoven material of this invention relates to a fine liner. This liner allows for a broad range of thicknesses, including a thickness below 0.127 mm. Preferably the liner has a thickness in the range of about 0.02 to about 5.0 mm and most preferably in the range of about 0.05 to about 2.0 mm. Additionally the present invention relates to a self-lubricated bearing made with the liner. It is expected that the thin structures of the present invention will ensure for greater load bearing capacity, lower clearances, higher stiffness and facilitated heat transfer in the bearing. Furthermore, the use of thermally conductive fibers increase the thermal conductivity of the liner and increases thus the operating speed range of the bearing.

TEST METHODS

The following test methods were used in the Examples provided below. The tensile strength of nonwoven materials of the present invention was measured on an Instron-type testing machine using test specimens 2.54 cm wide and a gage length of 18 cm, in accordance with ASTM D 828-93.

The thickness and basis weight of saturable nonwoven materials were determined by measuring the thickness and the weight of an area of a sample of the test nonwoven sheet in accordance with ASTM D 645/D 645-M-96 and ASTM D 646-96, respectively.

The friction performance of model flat bearing surfaces was tested on a High-Frequency, Linear-Oscillation (SRV) Test Machine from Optimol GmbH (ASTM D5707-97) at the Swiss Federal Laboratories for Materials Testing and Research—EMPA. Various samples of impregnated nonwoven sheets have been produced and applied onto steel substrates using epoxy type resins.

Linearly reciprocating Ball-on-Flat sample sliding tests were conducted on these samples in addition to samples made with a standard woven fluoropolymer liner (reference) under the following conditions:

| Test parameters: | |
|---|---|
| Type of contact: | Ball on disc |
| Ball diameter: | 10 mm |
| Ball material: | 100Cr6 steel |
| Vertical load: | stepwise 50, 100, 150 N |
| Amplitude: | +/−2 mm |
| Frequency: | 13.3 Hz |
| Number of cycles: | 96'000 |
| Temperature: | 25° C. |
| Relative Humidity: | 55 +/− 5 0% |

The test results show that the friction coefficients measured with the saturable nonwoven sheets of this invention (Example 1) lay at or below the values measured on the standard woven liner (Comparative Example 3). The wear rate in saturable nonwoven structures of this invention (Example 1), as measured by the interface position between ball and sample, is less than the wear rate measured on standard woven liners (Comparative Example 3) or on nonwoven structures without additional structural fiber (Comparative Example 2).

EXAMPLES

Example 1

An aqueous dispersion containing mixture of fluoropolymer floc, meta-aramid floc, meta-aramid fibrids and wet-strength resin was made at such relative content of non-aqueous components (percents by weight)as follows:
Fluoropolymer floc about 45.5%,
Meta-aramid floc about 36.4%,
Meta-aramid fibrids about 9.1%, and
Wet-strength resin about 9.0%.

The dispersions were poured into an approximately 21 cm×21 cm handsheet mold and a wet-laid sheet was formed. The sheet was placed between two pieces of blotting paper, hand couched with a rolling pin, and dried in a hand sheet dryer at about 190° C.

The fluoropolymer floc was polythetrafluoroethylene floc of linear density 0.71 tex and length 0.67 cm (sold by E. I. du Pont de Nemours and Company under trade name TEFLON® floc).

The meta-aramid fibrids were made from poly(metaphenylene isophthalamide) as described in U.S. Pat. No. 3,756,908.

The meta-aramid floc was poly(metaphenylene isophthalamide)floc of linear density 0.22 tex and length of 0.64 cm (sold by E. I. du Pont de Nemours and Company under the trade name NOMEX® floc).

The wet-strength resin was KYMENE® 557 LX resin (sold by Hercules Chemical Company).

The properties of the final nonwoven material are shown in Table 1.

The prepared nonwoven material was wetted with room temperature curing epoxy composition including, but not limited to, Scotch-Weld DP-460 epoxy adhesive (sold by the 3M Company) and squeezed between flat metal surface and metal roll. Produced prepreg was attached to the plate from stainless steel and pressed against the plate. After curing for 12 hours, a model self-lubricating bearing was ready.

The model bearing was tested on a friction performance at different levels of loading. The results of the test are shown in Table 2.

Example 2

Comparative Example

An aqueous dispersion containing a mixture of fluoropolymer floc and meta-aramid fibrids was made at such relative content of non-aqueous components (percents by weight) as follows:
Fluoropolymer floc at about 91.0%, and
Meta-aramid fibrids at about 9.0%.

A wet-laid handsheet was prepared as in Example 1, but with additional hot compression at about 300° C. and about 30 psi for about 5 minutes.

The fluoropolymer floc was a mixture of about 8 percent by weight of polythetrafluoroethylene floc having a linear density of about 0.71 tex and a length of about 0.67 cm and about 12% by weight of PFA floc having a linear density of about 1.10 tex and a length of about 0.67 cm (sold by E. I. du Pont de Nemours and Company under trade name TEFLON® floc).

The meta-aramid fibrids were made from poly(metaphenylene isophthalamide) as described in U.S. Pat. No. 3,756,908.

The properties of the final nonwoven material are shown in Table 1.

A model self-lubricating bearing was prepared and tested as in Example 1.

Results of the friction test are shown in Table 2.

Example 3

Comparative Example

DACRON®/TEFLON® bearing fabric, a plane weave based on TEFLON® and DACRON continuous filament yarns having a linear density of 44 tex each (sold by Bally Ribbon Mills), was impregnated by epoxy resin as in Example 1 and a model self-lubricating bearing was prepared by the same technique.

Results of the friction test are shown in Table 2.

Example 4

Comparative Example

An aqueous dispersion containing mixture of fluoropolymer floc, meta-aramid floc, meta-aramid fibrids and wet-strength resin was made at such relative content of non-aqueous components (percents by weight) as follows:
Fluoropolymer floc 45.5%,
Meta-aramid floc 24.5%,
Meta-aramid fibrids 20.0%, and
Wet-strength resin 10.0%.

A sheet of nonwoven material was prepared as in example 1 and all components of the composition were the same as in Example 1. Properties of the nonwoven material are shown in Table 1.

During preparation of the prepreg it was impossible to achieve full wetting of the nonwoven sheet with a resin due to a high content of the binder in the formed sheet.

TABLE 1

| Example | Basis weight g/m$^2$ | Thickness mm |
|---|---|---|
| 1 | 90 | 0.28 |
| 2 | 130 | 0.37 |
| 3 | 240 | 0.38 |
| 4 | 90 | 0.26 |

TABLE 2

| Example | Coefficient of friction at loading 25-30 N | Coefficient of friction at loading 100-150 N | Wear after 800 min loading at 100 N(mkm) |
|---|---|---|---|
| 1 | 0.18 | 0.20 | 45 |
| 2 | 0.22 | 0.22 | 110 |
| 3 | 0.22 | 0.25 | 100 |

What is claimed is:

1. A prepreg comprising a matrix resin and a saturable nonwoven material comprising a resin impregnatable structure including a mixture dispersed therein of at least one fluoropolymer floc; at least one wettable structural organic floc; and a binder wherein the binder is up to about 20% by weight of the saturable nonwoven material; and wherein the material has a basis weight of about 17 g/m$^2$ to about 810 g/m$^2$ and a thickness of about 0.02 mm to about 8.2 mm.

2. A self-lubricating bearing comprising a saturable nonwoven material comprising a resin impregnatable structure including a mixture dispersed therein of at least one fluoropolymer floc; at least one wettable structural organic floc; and a binder wherein the binder is up to about 20% by weight of the saturable nonwoven material; and wherein the material has a basis weight of about 17 g/m$^2$ to about 810 g/m$^2$ and a thickness of about 0.02 mm to about 8.2 mm.

3. A process for making a saturable nonwoven material comprising a resin impregnatable structure including a mixture dispersed therein of a least one fluoropolymer floc; at least one wettable structural organic floc; and a binder wherein the binder is up to about 20% by weight of the saturable nonwoven material; and wherein the material has a basis weight of about 17 g/m$^2$ to about 810 g/m$^2$ and a thickness of about 0.02 mm to about 8.2 mm comprising the steps of:
 a) delivering an aqueous dispersion of a mixture comprising the wettable structural organic floc, fluoropolymer floc and binder onto a screen of a papermaking device;
 b) withdrawing water from the aqueous dispersion to leave a wet paper felt; and
 c) drying the wet paper felt.

4. The process according to claim 3, further comprising calendering the dried nonwoven material for further densification of the material.

* * * * *